United States Patent
Kim

(10) Patent No.: US 6,785,561 B1
(45) Date of Patent: Aug. 31, 2004

(54) METHOD OF IMPLEMENTING NETWORK GAME FUNCTION USING PORTABLE TELEPHONE

(75) Inventor: Jong-Kwang Kim, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 405 days.

(21) Appl. No.: 09/631,848

(22) Filed: Aug. 3, 2000

(30) Foreign Application Priority Data

Aug. 5, 1999 (KR) ........................................ 1999-32178

(51) Int. Cl.[7] ............................ H04Q 7/24; A63F 13/00
(52) U.S. Cl. ..................... 455/566; 455/412; 455/414.1; 463/40; 463/41; 463/42; 463/43
(58) Field of Search ............................. 463/42, 43, 40, 463/41; 455/412, 414, 566

(56) References Cited

U.S. PATENT DOCUMENTS

| | | | | |
|---|---|---|---|---|
| 5,999,808 A | * | 12/1999 | LaDue | ..................... 455/412.2 |
| 6,134,590 A | * | 10/2000 | Perlman | ..................... 709/228 |
| 6,416,414 B1 | * | 7/2002 | Stadelmann | ................. 463/42 |
| 6,470,180 B1 | * | 10/2002 | Kotzin et al. | ............... 455/412 |
| 6,524,189 B1 | * | 2/2003 | Rautila | ........................ 463/40 |

FOREIGN PATENT DOCUMENTS

| | | |
|---|---|---|
| CN | 1158458 A | 9/1997 |
| JP | 11-194985 | 7/1999 |

OTHER PUBLICATIONS

English abstract of Japanese publication No. 11-114224, date of publication Apr. 27, 1999 Applicant: Nakanishi Hiroyuki, Application No. 09-277783, Date of Filing Sep. 10, 1997.*

First Office Action of The Patent Office of the People's Republic of China dated Nov. 1, 2002, issued in a counterpart application, namely, Appln. No. 00122633.9.

* cited by examiner

Primary Examiner—Nay Maung
Assistant Examiner—Alan T. Gantt
(74) Attorney, Agent, or Firm—Dilworth & Barrese LLP

(57) ABSTRACT

A method of implementing a network game function using a portable telephone that enables a plurality of users having portable telephones to enjoy a game simultaneously. The portable telephones are first designated to perform the network game. If the network game starts, the portable telephone performs the network game program in accordance with key signals for the network game inputted by a user, and transmits game data corresponding to the inputted key signals to the opposite portable telephone. The portable terminal receives the game data from the opposite portable telephone, and performs the network game program corresponding to the changed data. The same game picture is displayed on a display section of the respective portable telephone which performs the network game in accordance with the game data changed in real time.

5 Claims, 3 Drawing Sheets

METHOD OF IMPLEMENTING NETWORK GAME FUNCTION USING PORTABLE TELEPHONE

PRIORITY

This application claims priority to an application entitled "Method of Implementing Network Game Function Using Portable Telephone" filed in the Korean Industrial Property Office on Aug. 5, 1999 and assigned Serial No. 99-32178, the contents of which are hereby incorporated by reference.

BACKGROUND OF THE INVENTION

1. Field of the Invention

The present invention relates to an additional function of a portable telephone, and more particularly to a method of implementing a network game function using a portable telephone which enables a plurality of users having portable telephones to enjoy a game simultaneously.

2. Description of the Related Art

According to the recent tendency, a portable telephone is not limited to its primary function of making a telephone call as it moves irrespective of its location, but secures its position as an integrated information communication appliance as well as a composite appliance.

Among diverse functions added to the portable telephone, a game function whereby a user can enjoy a game using the portable telephone is implemented. The game function implemented in the portable telephone has no relation to other portable telephones, and thus the user only enjoys the game alone using a built-in game program.

However, the user is liable to get bored with such a game that he/she plays alone, and the game function implemented in the portable telephone may become useless. In order that the game function added to the portable telephone becomes useful to the user, a multi-user game function, whereby the user can enjoy the game simultaneously with other users, is required.

Meanwhile, network games have been proposed which have a multi-user game function adapted to allow a plurality of users to enjoy the same game simultaneously through a network linked to personal computers (PC). However, such a network game linked to the PC is supported only through wire, and is available in a limited number of places.

SUMMARY OF THE INVENTION

Accordingly, the present invention has been made in an effort to solve the problems occurring in the related art, and an object of the present invention is to provide a network game function implementing method in a portable telephone that enables a plurality of users to enjoy the same game simultaneously through portable mobile telephones.

In order to achieve the above object, according to the present invention, there is provided a network game function implementing method in a portable telephone whereby a network game is performed simultaneously with other portable telephones having the same network game program, the method comprising the steps of designating the portable telephones to perform the network game; if the network game starts, performing the network game program in accordance with key signals for the network game inputted by a user, transmitting game data corresponding to the inputted key signals for the network game from the user's portable phone to one or more other portable telephones participating in the game, receiving game data transmitted from the one or more other portable telephones participating in the game, and performing the network game program corresponding to the changed data; and displaying the same game picture on a display section of the respective portable telephone performing the network game in accordance with the game data changed in real time.

BRIEF DESCRIPTION OF THE DRAWINGS

The above object and advantages of the present invention will become more apparent by describing in detail the preferred embodiments thereof with reference to the attached drawings in which.

DETAILED DESCRIPTION OF THE PREFERRED EMBODIMENTS

Figure 1:
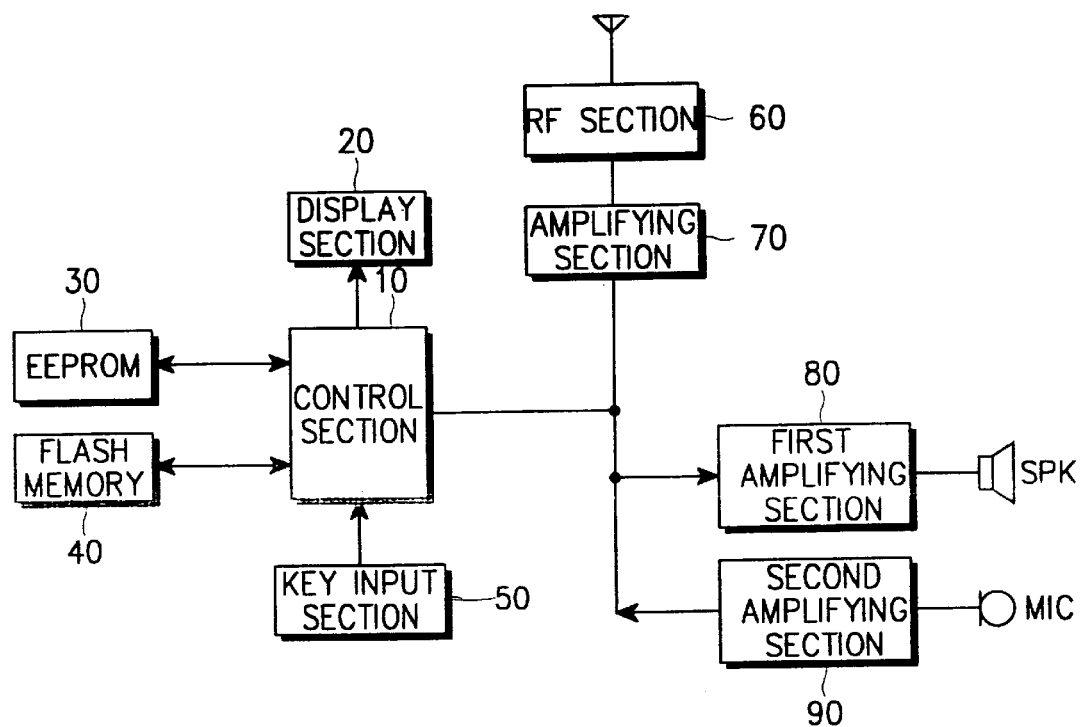
FIG. 1 is a block diagram of a portable telephone for performing a network game function according to an embodiment of the present invention.

The preferred embodiments of the present invention will now be explained in detail with reference to the accompanying drawings. In the drawings, the same elements are denoted by the same reference numerals even though they are depicted in different drawings. In the following description of the present invention, many specified items such as detailed processing flows are indicated, but they are provided only for the whole understanding of the present invention and thus it will be understood by those skilled in the art that the present invention can be performed without such specified items. In explaining the present invention, a detailed description of known functions and configurations incorporated herein will be omitted when it may make the subject matter of the present invention rather unclear.

FIG. 1 is a block diagram of a portable telephone for performing a network game function according to an embodiment of the present invention.

Referring to FIG. 1, a control section 10 controls the whole operation of the portable telephone. The control section 10 receives game data and various other kinds of data originated from a base station through an RF transmitting/receiving section 60 and an amplifying section 70, and provides it to corresponding circuit sections. The control section 10 also generates the game data and various other kinds of data, and sends it to the base station through the amplifying section 70 and the RF transmitting/receiving section 60. The control section 10 also controls the performance of the network game function when the network game function is selected.

A first amplifying section 80 amplifies an audio signal outputted to a speaker.

A second amplifying section 90 amplifies an audio signal inputted from a microphone.

A key input section 50 is provided with control keys, numeral keys, and command keys for generating various kinds of control signals, which are required for performing the network game function.

An EEPROM 30 stores therein number assignment module (NAM) parameters, telephone numbers, names, and short message service (SMS) messages.

A flash memory 40 stores therein various kinds of program data and recognition data, and stores a built-in operating program required for performing the game function according to the present invention.

The RF section 60 receives various kinds of data and audio signals received through an antenna, and provides them to the amplifying section 70. Also, the RF section 60 transmits various kinds of data and audio signals received from the amplifying section 70 to the base station through the antenna.

The amplifying section 70 amplifies the audio signal and transmitted and received data.

A display section 20 receives various kinds of display data from the control section 10, and displays the data on its screen (for example, liquid crystal display (LCD)). The display section 20 also displays a game operating picture under the control of the control section 10 while performing the network game function according to the present invention.

Figure 2:
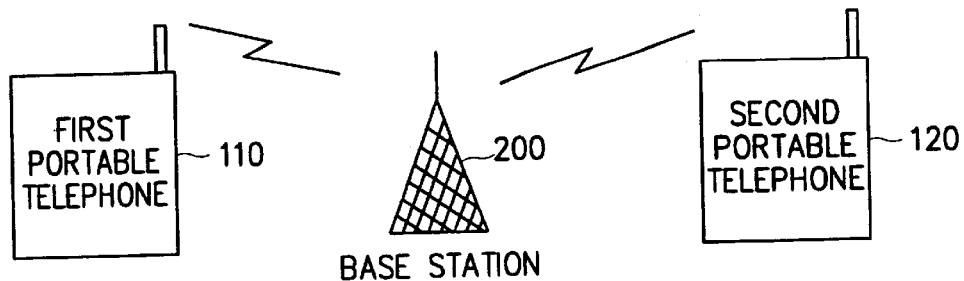
FIG. 2 is a view explaining the network game function performed wirelessly through a base station according to an embodiment of the present invention.

FIG. 2 is a view explaining the network game function performed wirelessly through a base station according to an embodiment of the present invention.

Referring to FIG. 2, the game function is performed between a first portable telephone 110 and a second portable telephone 120 through a base station 200. In this case, the network game program is stored in each portable telephone, and a plurality of other portable telephones which can perform the network game are registered. The registration of other portable telephones can be effected by giving and registering the identification (ID) numbers of the portable telephones to the network via the base station and the base station transmits the registration information to each of the other registered portable telephones. Each portable telephone is programmed to designate any portable telephone among the plurality of other portable telephones which are registered as a network game companion, and plays the network game with the designated portable telephone.

If the first portable telephone 110 designates the second portable telephone 120 and requests the network game to the base station 200, the base station 200 links the first and second portable telephones 110 and 120. Thereafter, the first and second portable telephones 110 and 120 determine the same network game environment, and perform the network game. At this time, since the same network game program is registered in the first and second portable telephones 110 and 120, the portable telephone 110 controls game variables in accordance with game variable data received from the second portable telephone 120 through the base station 200 and game variable data inputted from its own key input section. Similarly, second portable telephone 120 controls game variables in accordance with game variable data received from the first portable telephone 110 through the base station 200 and game variable data inputting from its own key input section. Accordingly, the situation of the network game progress is equal for both the first and second portable telephones 110 and 120, and thus the same network game picture is displayed on the display sections of the first and second portable telephones.

If two or more portable telephones are designated to simultaneously play the network game, specified portable telephones are determined among the plurality of other portable telephones registered as a network game companion, and the designated portable telephones are linked to the specified portable telephone to perform the network game through the base station. At this time, data transmission/reception is performed using a plurality of channels allocated to the portable telephones.

Figure 3:
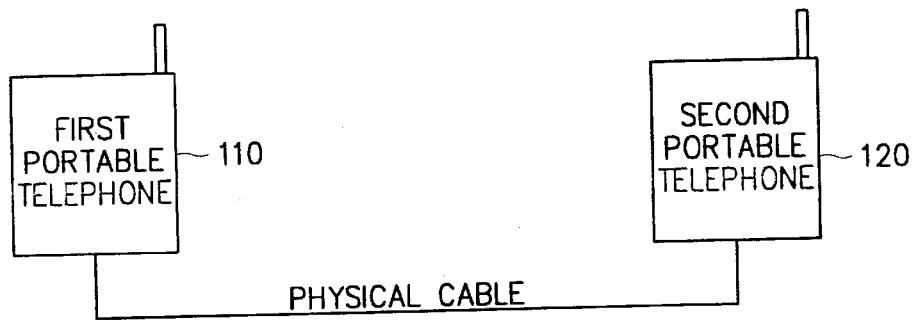
FIG. 3 is a view explaining the network game function performed by wire according to an embodiment of the present invention.

FIG. 3 is a view explaining the network game function performed by wire according to an embodiment of the present invention. In the embodiment of FIG. 3, the network game variable data is transmitted and received between the first and second portable telephones 110 and 120, wherein the same network game program is stored, using a physical cable connected therebetween to perform the same network game function.

Figure 4:
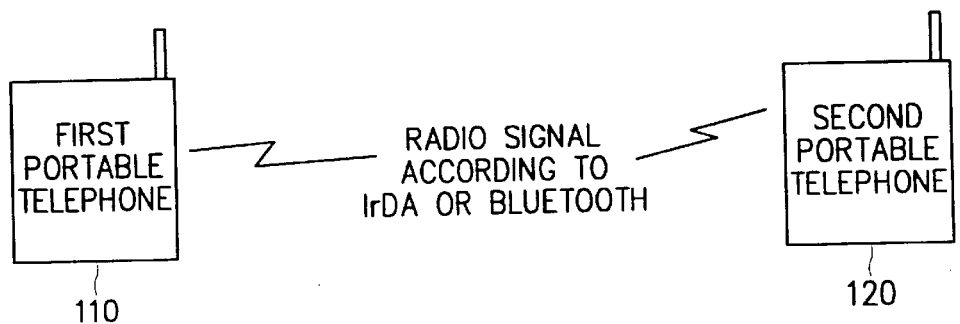
FIG. 4 is a view explaining the network game function performed using a radio frequency (RF) signal according to IrDA (Infrared Data Association) or Bluetooth in accordance with an embodiment of the present invention.

FIG. 4 is a view explaining the network game function performed using an RF signal according to IrDA or Bluetooth in accordance with an embodiment of the present invention. In the embodiment of FIG. 4, the network game is performed in a wireless fashion between the portable telephones using an infrared ray communication, that is, IRDA, or the game variable data required for the mutual game progress is transmitted and received in a wireless fashion between the portable telephones using a radio signal according to Bluetooth. At this time, the respective portable telephone is provided with an infrared ray receiving, transmitting and processing sections or sections that receive, transmit and process radio signals according to Bluetooth to perform the network game.

Figure 5:
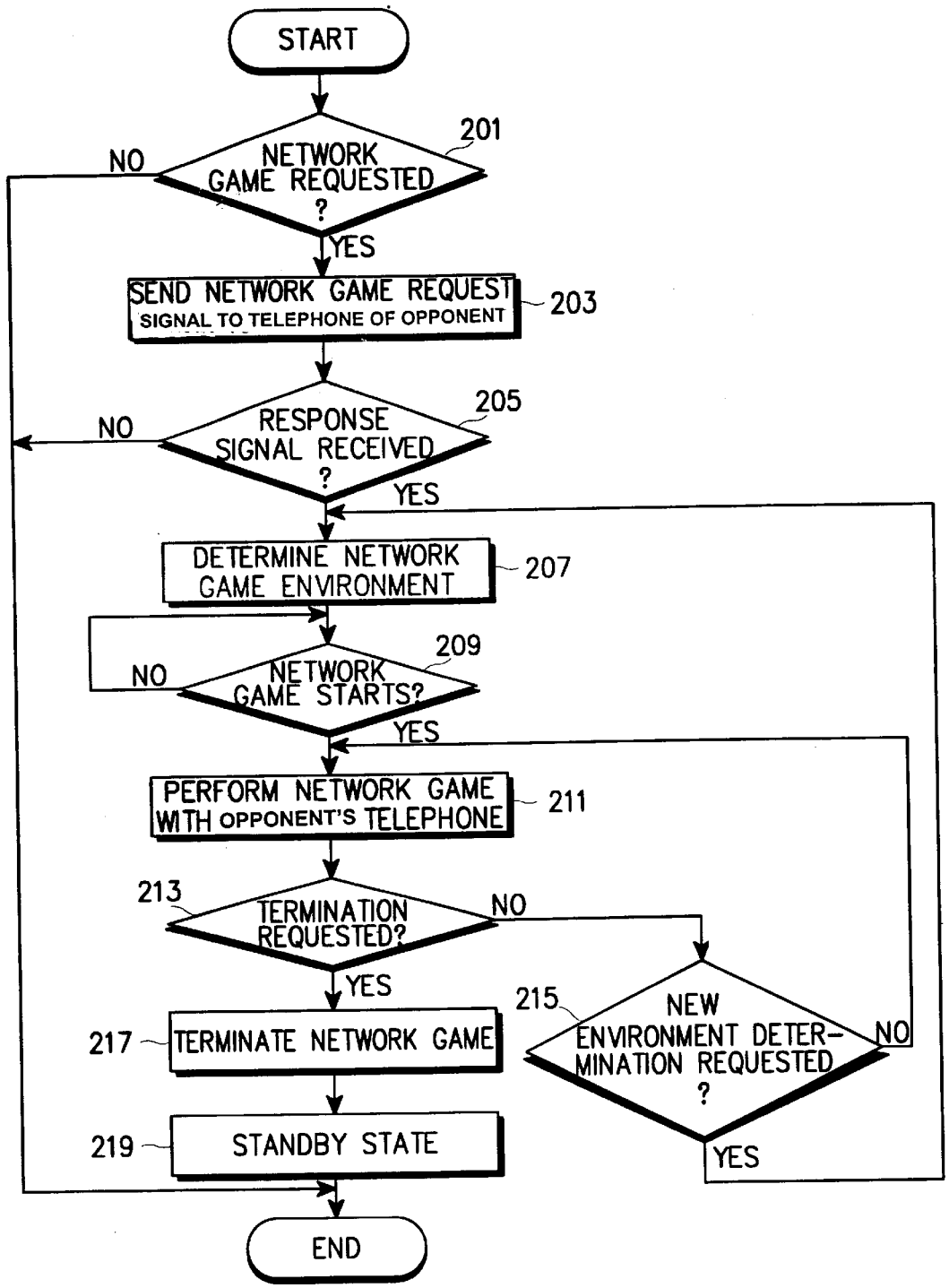
FIG. 5 is a flowchart illustrating the process of performing the network game function according to the preferred embodiment of the present invention.

FIG. 5 is a flowchart illustrating the process of performing the network game function according to the preferred embodiment of the present invention.

Now, the preferred embodiment of the present invention will be explained in detail with reference to FIGS. 1 to 5.

First, referring to FIG. 5, the control section 10 detects whether the network game is requested at step 201. This network game request is effected by inputting a network game request key through the key input section and designating the prospective opponent's portable telephone. If the network game request is detected, the control section 10 proceeds to step 203, and transmits the network game request signal to the opponent's portable telephone through the base station 200. At this time, if a plurality of the opponents' portable telephones are designated, the control section 10 transmits the ID numbers of the respective portable telephones to the base station 200, so that the base station 200 transmits the network game request signal to the corresponding portable telephones.

Thereafter, if a response signal is received from the opponent's portable telephone through the base station 200 at step 205, the control section 10 proceeds to step 207, and determines the network game environment by performing the network game program. At this time, the opponent's portable telephone also determines the network game environment. If the network game is determined as described above, the control section proceeds to step 209, and checks if the network game start is selected. If the network game start is selected, the control section 10 proceeds to step 211, and performs the network game with the opponent's portable telephone. As described above, the network game is performed by transmitting and receiving the variable data required for the network game between the participating telephones. Thereafter, if the termination of the network game is requested at step 213, the control section 10 proceeds to step 217 to terminate the network game, while if not, the control section 10 proceeds to step 215, and checks if determination of a new environment for the network game is requested. If the new environment is requested, the control section 10 returns to step 207, while if not, it returns to step 211 to continue the network game function.

At step 217, the control section 10 terminates the network game, and proceeds to step 219 to be in a standby state.

As described above, according to the present invention, a portable telephone having a network game function designates other portable telephones for performing the network game together, and the respective portable telephones determines the environment required for performing the game. The game environment means an environment determined by the user before starting the game in a general game program. If the game starts after the network game environment is determined for the respective portable telephones as described above, the portable telephone performs the network game program in accordance with the key signals for the game inputted by the user, and transmits the game data corresponding to the key signals for the game inputted to the opponent's portable telephone. Also, the portable telephone receives the game data from the opponent's portable telephone, and performs its own network game program corresponding to the changed data. The transmission and reception of the game data is performed through the base station 200. On the display section of each portable telephone, which performs the network game, is continuously displayed the same game picture according to the game variable data changed in real time.

In the case wherein two or more portable telephones simultaneously perform the network game, the base station 200 allocates channels required for performing the multiuser game, and controls the transmission and reception of the game data of the respective portable telephones.

Also, the respective portable telephones supported with the network game receive and register a new network game program downloaded from the base station 200. If a plurality of network game programs are registered in each portable telephone, one of the network programs is selected to match that of the opponent's portable telephone when an associated network game is requested.

Meanwhile, according to the preferred embodiment of the present invention, the network game implementing method using the base station 200 is explained. However, the network game can also be implemented using a physical cable as shown in FIGS. 3 and 4, using a signal according to IrDA or Bluetooth, or by performing direct communications between the portable telephones. Embodiments thereof are obvious to one ordinary skilled in the art with reference to the network game implementing method as shown in FIG. 2, and the detailed explanation thereof will be omitted.

As described above, it will be apparent that the present invention provides the advantages that the multi-user network game function can be implemented through a plurality of remote portable telephones, and thus a plurality of users can enjoy the same game simultaneously through the portable telephones irrespective of their locations.

While this invention has been described in connection with what is presently considered to be the most practical and preferred embodiments, it is to be understood that other modifications thereof may be made without departing from the scope of the invention. Thus, the invention should not be limited to the disclosed embodiment, but should be defined by the scope of the appended claims and their equivalents.

What is claimed is:

1. A network game function implementing method in a first portable telephone whereby a network game is performed simultaneously with one or more other portable telephones having the same network game program, the method comprising the steps of:

registering in a base station each portable telephone capable of performing the network game function and having the network game programs stored therein;

designating the one or more other portable telephones that are registered as having corresponding network game programs to perform the network game;

if the network game starts, performing the designated network game program in accordance with key signals for the network game inputted by a user in the first portable telephone, transmitting, via an environment of the base station, game data corresponding to the inputted key signals to the one or more other portable telephones, receiving game data corresponding to inputted key signals by users of the one or more other portable telephones, and performing the network game program corresponding to the changed data;

displaying the same game picture on a display section of the first portable telephone which performs the network game in accordance with the game data changed in real time; and changing to a new environment if a change in environment is requested by the portable telephones performing the network game.

2. The method as claimed in claim 1, wherein reception of the game data by the first portable telephone and the one or more other portable telephones is performed through the base station.

3. The method as claimed in claim 1, wherein transmission and reception of the game data between the first portable telephones and the one or more other portable telephones is performed between the portable telephones through a physical cable as the new environment.

4. The method as claimed in claim 2, wherein transmission and reception of the game data between the first portable telephone and the one or more other portable telephones is performed between the portable telephones using an infrared ray signal as the new environment.

5. The method as claimed in claim 2, wherein transmission and reception of the game data between the first portable telephone and the one or more other portable telephones is performed between the portable telephones using a radio signal according to Bluetooth as the new environment.

* * * * *